United States Patent
Chueh et al.

(10) Patent No.: US 8,676,227 B2
(45) Date of Patent: Mar. 18, 2014

(54) METHOD OF PERFORMING A DATA TRANSACTION BETWEEN A PORTABLE STORAGE DEVICE AND AN ELECTRONIC DEVICE

(75) Inventors: Chao-Feng Chueh, Taipei (TW); Pei-Yu Huang, New Taipei (TW); Li-Jen Chao, New Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 290 days.

(21) Appl. No.: 13/114,000

(22) Filed: May 23, 2011

(65) Prior Publication Data
US 2012/0302162 A1    Nov. 29, 2012

(51) Int. Cl.
*H04W 24/00*    (2009.01)

(52) U.S. Cl.
USPC .................. 455/456.1; 455/404.2; 455/457; 709/204

(58) Field of Classification Search
USPC ............... 455/456.1, 404.2, 457, 456.3, 421, 455/3.02; 709/204, 248; 701/215, 207
See application file for complete search history.

(56) References Cited

U.S. PATENT DOCUMENTS

| | | | |
|---|---|---|---|
| 5,940,012 A * | 8/1999 | Studebaker | 340/932.2 |
| 6,400,785 B1 * | 6/2002 | Sunaga et al. | 375/372 |
| 6,484,033 B2 | 11/2002 | Murray | |
| 6,874,037 B1 * | 3/2005 | Abram et al. | 709/248 |
| 7,379,795 B2 * | 5/2008 | Arnouse | 701/3 |
| 7,584,226 B2 * | 9/2009 | Fatula et al. | 1/1 |
| 7,698,428 B2 * | 4/2010 | Fatula, Jr. | 709/226 |
| 7,739,409 B2 * | 6/2010 | Yanovsky | 709/248 |
| 7,787,886 B2 * | 8/2010 | Markhovsky et al. | 455/456.1 |
| 2003/0114206 A1 | 6/2003 | Timothy | |
| 2006/0089152 A1 | 4/2006 | Mahonen | |
| 2009/0170502 A1 | 7/2009 | Levien | |
| 2012/0066303 A1 * | 3/2012 | Purdy | 709/204 |
| 2012/0322380 A1 * | 12/2012 | Nannarone et al. | 455/41.2 |

FOREIGN PATENT DOCUMENTS

TW    I260139    8/2006

* cited by examiner

*Primary Examiner* — Minh D Dao

(74) *Attorney, Agent, or Firm* — Winston Hsu; Scott Margo

(57) ABSTRACT

A method of performing a data transaction between a portable storage device and an electronic device includes determining positions of the portable storage device by a positioning module of the portable storage device, calculating distance between a current position and a position of a previous data transaction to determine whether a position-based criterion is met by a processing module, establishing a data connection between the portable storage device and the electronic device when the position-based criterion is met, and performing the data transaction between the portable storage device and the electronic device.

20 Claims, 4 Drawing Sheets

METHOD OF PERFORMING A DATA TRANSACTION BETWEEN A PORTABLE STORAGE DEVICE AND AN ELECTRONIC DEVICE

BACKGROUND

The disclosure relates to portable storage devices, and particularly to a method of performing a data transaction between a portable storage device and an electronic device according to a position-based criterion.

Portable storage devices are convenient for providing a large amount of data storage that is portable for use at any location. Portable storage devices are also commonly used for backing up data. A user may connect a portable storage device to a personal computer or notebook, and use backup software to backup the data on the personal computer or notebook. The backup software may include scheduling functions for backing up data on the personal computer or notebook daily, weekly, or monthly.

However, many individuals and families access more than one computer over the course of one day, week, or month. For example, a user may have a home computer, office computer, notebook, tablet, and/or other computers. If the user frequently carries the portable storage device with him/her to add, delete and/or modify data across multiple computers, the user may forget to perform backup or lack motivation and willpower to perform routine backups of all data. Although the scheduling functions mentioned above provide an aid for increasing frequency of data backups, the backups may be too frequent or too infrequent, and may not have a meaningful tie to the usage pattern of the user.

SUMMARY

According to an embodiment, a method of performing a data transaction between a portable storage device and an electronic device comprises determining positions of the portable storage device by a positioning module, calculating distance between a current position and a position of a previous data transaction and determining whether a position-based criterion is met by a processing module, establishing a data connection between the portable storage device and the electronic device when the position-based criterion is met, and performing the data transaction between the portable storage device and the electronic device.

According to an embodiment, a method of performing a data transaction between a portable storage device and an electronic device comprises determining positions of the portable storage device by a positioning module, calculating distance between a current position and a position of previous data transaction to determine whether a position-based criterion is met by a processing module, setting a first flag in a storage module of the portable storage device by the processing module when a position-based criterion is met, and attempting to establish a data connection between the portable storage device and the electronic device when at least the first flag is set.

According to an embodiment, a portable storage device comprises a storage module for storing data, a positioning module for determining positions of the portable storage device, a transceiver for establishing a data connection with the electronic device, and a processing module for synchronizing the data with an electronic device through the transceiver when the processing module determines that at least a position-based criterion is met according to the positions of the portable storage device.

These and other objectives of the present invention will no doubt become obvious to those of ordinary skill in the art after reading the following detailed description of the preferred embodiment that is illustrated in the various figures and drawings.

DETAILED DESCRIPTION

In the following, various embodiments of methods and related apparatuses for performing a data transaction between a portable storage device and an electronic device based at least on approximate position of the portable storage device are described. The data transaction may include, but is not limited to, backup of data, synchronization of data, deletion of data, generation of data, storage of data, encryption of data, compression of data, defragmenting of data, and virus scan. The approximate position may be obtained through a positioning module including, but not limited to, a Global Navigation Satellite System (GNSS) receiver (GPS, GLONASS, Galileo) of the portable storage device or connected to the portable storage device, a cellular base station positioning module of the portable storage device or the electronic device connected thereto, a Wi-Fi (according to IEEE 802.11 standard) base station positioning module, a WiMAX (according to IEEE 802.16 standard) base station positioning module, and/or user-inputted position.

Figure 1:
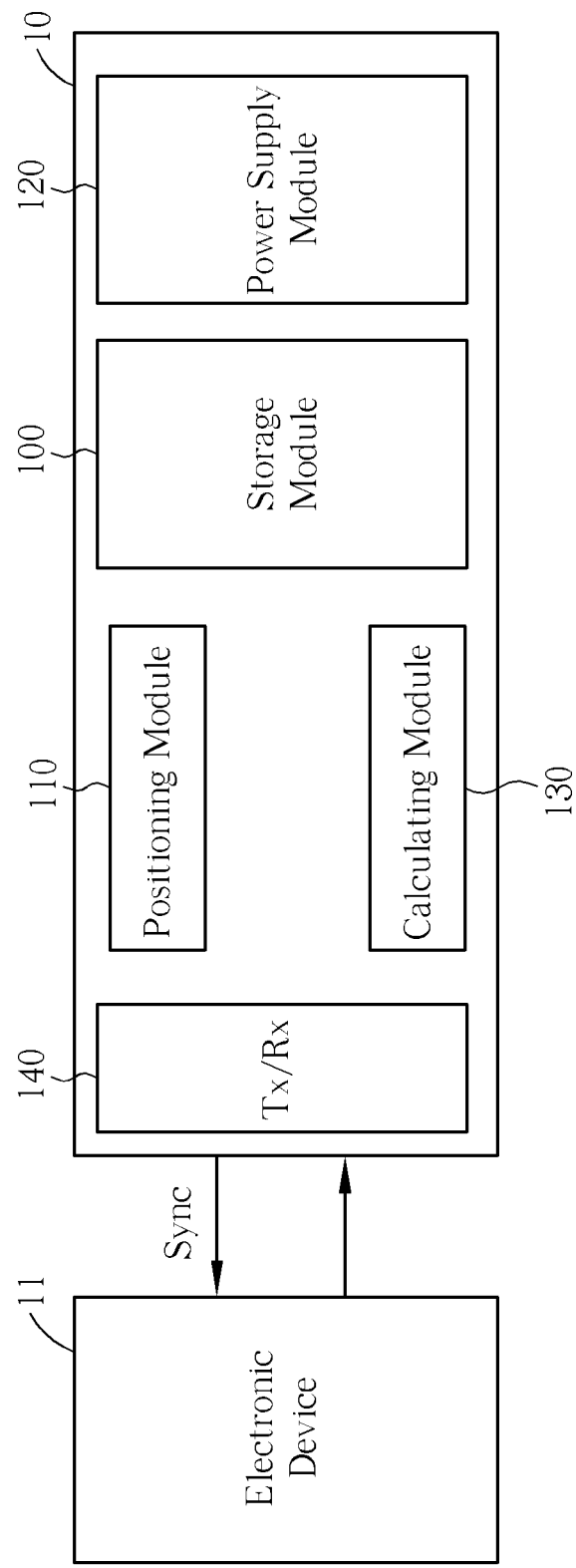
FIG. 1 is a diagram illustrating a portable storage device and an electronic device according to an embodiment.

Please refer to FIG. 1, which is a diagram illustrating a portable storage device 10 and an electronic device 11 according to an embodiment. The portable storage device 10 comprises a storage module 100, a positioning module 110, a power supply module 120, a processing module 130, and a transceiver (Tx/Rx) 140. The storage module 100 is for storing data, such as text files, image files, video files, or other digital data, and may be a magnetic storage such as hard disk drive, an optical storage such as compact disc (CD), digital versatile disc (DVD) or Blu-ray disc (BD), a solid state storage such as flash memory, or any combination thereof. The positioning module 110 is for obtaining position of the portable storage device 10, and may be a GNSS receiver, a mobile base station positioning module, a cellular base station positioning module, a Wi-Fi (according to IEEE 802.11b standard) positioning module or other positioning device. The transceiver 140 is for sending/receiving data between the storage module 100 and the electronic device 11, and may be a wireless transceiver such as a cellular network transceiver, Wi-Fi transceiver, or Bluetooth transceiver, or a wired transceiver such as a USB transceiver, IEEE 1394 transceiver, eSATA transceiver or IDE transceiver. The transceiver 140 may be utilized to establish a data connection with the electronic device 11 for performing data transactions. The processing module 130 is configured to perform distance-based, time-based, and data-based calculations. For example, the processing module 130 may determine distances based on positions obtained by the positioning module 110. The processing module 130 may include clocks for determining times, such as time since last data transaction. The processing module 130 may also compare files stored in the storage module 100 to determine whether the files are new, updated, deleted, or otherwise modified. The power supply module 120 is for supplying power to the storage module 100, the positioning module 110, the processing module 130, and the transceiver 140, and may be a battery. The electronic device 11 may be a personal computer or notebook, a server, a cloud service, or even another portable storage device, and is capable of engaging in a data transaction with the portable storage device 10. The positioning module 110 is optional. The electronic device 11 may include a positioning module, and the portable storage device 10 may receive position information generated by the positioning module of the electronic device 11. The portable storage device 10 may also include an altimeter for determining altitude of the portable storage device 10. Using the altimeter in combination with the positioning module 110, the processing module 130 may calculate three-dimensional position of the portable storage device 10.

Figure 2:
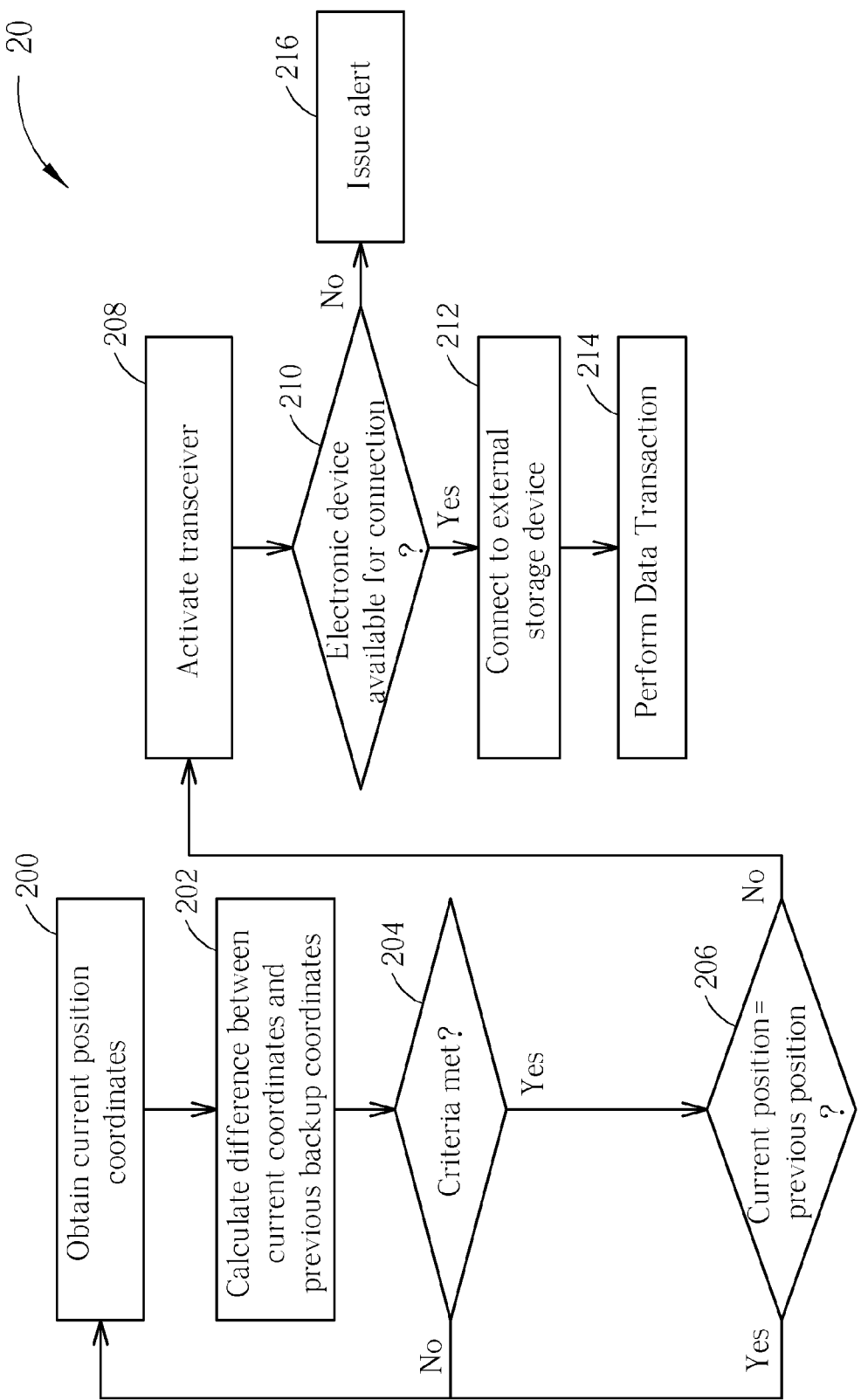
FIG. 2 is a flowchart of a process for performing a data transaction between a portable storage device and an electronic device according to a position-based criterion.

Please refer to FIG. 2, which is a flowchart of a process 20 for performing a data transaction between a portable storage device and an electronic device according to a position-based criterion. The process 20 may be utilized in the portable storage device 10 shown in FIG. 1, and includes the following steps:

Step 200: Obtain current position coordinates;
Step 202: Calculate difference between the current position coordinates and previous coordinates;
Step 204: Determine whether one or more criteria are met; if not, go to step 200; if so, go to step 206;
Step 206: Determine whether the current position is the same as a previous position; if so, go to step 200; if not, go to step 208;
Step 208: Activate the transceiver;
Step 210: Determine whether the electronic device is available for connection; if so, go to step 212; if not, go to step 216;
Step 212: Connect to the electronic device;
Step 214: Perform the data transaction;
Step 216: Issue an alert.

The positioning module 110 may continuously obtain position coordinates of the portable storage device 10 (step 200). A previous data transaction log may be stored in the storage module 100 that comprises information about a previous data transaction performed between the portable storage device 10 and the electronic device 11, including previous coordinates and time of the previous data transaction, as well as data transaction details such as files synchronized, files backed up, etc. during the previous data transaction. For example, the previous coordinates may be 2-dimentional or 3-dimentional coordinates corresponding to a home, office, or school. The processing module 130 may continuously compare the position coordinates with the previous coordinates (step 202) to determine distance that the portable storage device 10 has traveled from the previous coordinates, including but not limited to shortest distance from the previous coordinates, and total distance traveled since a previous data transaction. The total distance traveled may be calculated by tracking a series of positions of the portable storage device 10 over time, and adding up each segment between consecutive positions in the series.

The criteria in step 204 include position-based criteria, and may also include time criteria, and/or data change criteria. For example, a predetermined distance threshold may be set. The predetermined distance threshold may be stored in the storage module 100, and may indicate total distance the portable storage device 10 may be traveled, or a minimum distance away from the previous coordinates, as a condition for performing a data transaction using the content of the portable storage device 10. For example, the data transaction may be activated when the portable storage device travels a total distance of 500 meters. Or, the data transaction may be activated when the portable storage device is at least 500 meters from the previous coordinates. Total distance traveled and distance from previous data transaction are not mutually exclusive, and may be considered together as part of the criteria used in step 204. As mentioned above, time-based criteria and/or data-based criteria may be used in conjunction with the position-based criteria just described. For example, time lapse since last data transaction may be combined with the position-based criteria described. Data-based criteria may include number of files changed, size of files changed, and/or percent of files changed since last transaction.

Once the one or more criteria in step 204 are met, the current position of the portable storage device 10 may be determined at any time, and stored in the storage module 100. If the current position is different from the previous position by more than a predetermined range (step 206), e.g. the portable storage device 10 has traveled from the home to the office, the transceiver 140 is activated (step 208), and a request is sent to the electronic device 11 to determine availability of the electronic device 11 for the data transaction (step 210). Please note that step 206 is optional. The process 20 may proceed directly to step 208 from step 204. For example, once the portable storage device 10 has traveled a total distance of 500 meters, the transceiver is activated (step 208), regardless of whether the current location is different from the previous location.

If the electronic device 11 is available (step 210), a data connection is established with the electronic device 11 (step 212). Once the connection is established, the data transaction between the portable storage device 10 and the electronic device 11 is performed (step 214). If the electronic device 11 is unavailable, e.g. offline, the personal storage device 10 may issue an audible and/or visible alert to notify a user that the data transaction cannot be performed at this time (Step 216). The audible alert may be issued through speakers or a headphone jack of the portable storage device 10, and the visible alert may be issued through a display component of the portable storage device 10, such as a light-emitting diode (LED), or a liquid crystal display. Other types of alerts may also be issued, including (but not limited to) text, audio, or video transmitted to a mobile phone and/or email address of a user of the portable storage device 10.

Figure 3:
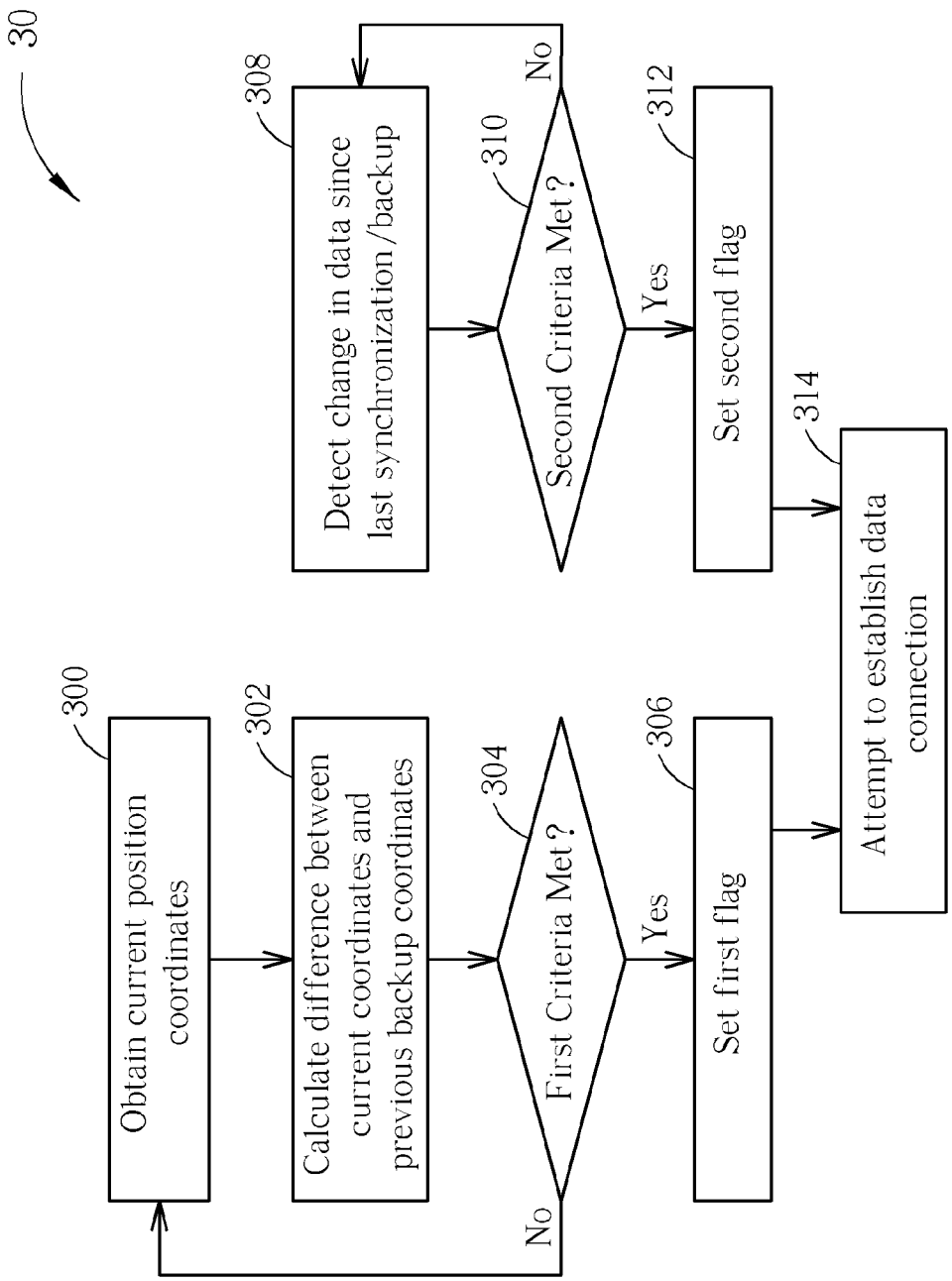
FIG. 3 is a flowchart of a process for performing a data transaction based on position-based data of a portable storage device according to another embodiment.

Please refer to FIG. 3, which is a flowchart of a process 30 for performing a data transaction based on position-based data of a portable storage device according to another embodiment. The process 30 may be utilized in the portable storage device 10 shown in FIG. 1, and includes the following steps:

Step 300: Obtain current position coordinates;
Step 302: Calculate difference between the current position coordinates and previous coordinates;
Step 304: Determine whether a first criterion is met; if not, go to step 300; if so, go to step 306;
Step 306: Set a first flag;
Step 308: Detect change in data since last data transaction;
Step 310: Determine whether a second criterion is met; if so, go to step 312; if not, go to step 308;
Step 312: Set a second flag; and
Step 314: Attempt to establish a data connection between the portable storage device and the electronic device when at least the first flag is set.

In the process 30, both distance traveled by the portable storage device 10 and amount of data changed/updated in the portable storage device 10 may be tracked to determine whether a data transaction is needed. Steps 300, 302, and 304 are similar to steps 200, 202, and 204 in the process 20. The first criterion may be the same as the predetermined distance threshold described above, and may be stored in the storage module 100. When the portable storage device 10 travels beyond the first threshold (total distance and/or distance from previous coordinates), as determined by the processing module 130, a first flag is set to indicate that a data transaction may be needed based on position of the portable storage device. Once the first flag is set, the positioning module 110 and the processing module 130 may both be turned off to save power.

In steps 308, 310, and 312, a second flag may be set based on a second criterion of how much data of the portable storage device 10 has changed since the previous data transaction. For example, the second criteria may include number of files changed, size of files changed, and/or percentage of files changed, e.g. 1%. The second criterion may be set by a user. If the second criterion is met at any time, the second flag is set. When the first flag is set, and optionally when the second flag is set, the portable storage device 10 attempts to establish a data connection with the electronic device 11 so as to perform the data transaction with the electronic device 11 (Step 314).

Please note that the first and second criteria described above are not limited to distance difference and data changes, and the process 30 is not limited to two flags. Position-, time-, and data-based criteria may be evaluated independently to generate a plurality of flags used as a basis for determining whether a data transaction is required.

Figure 4:
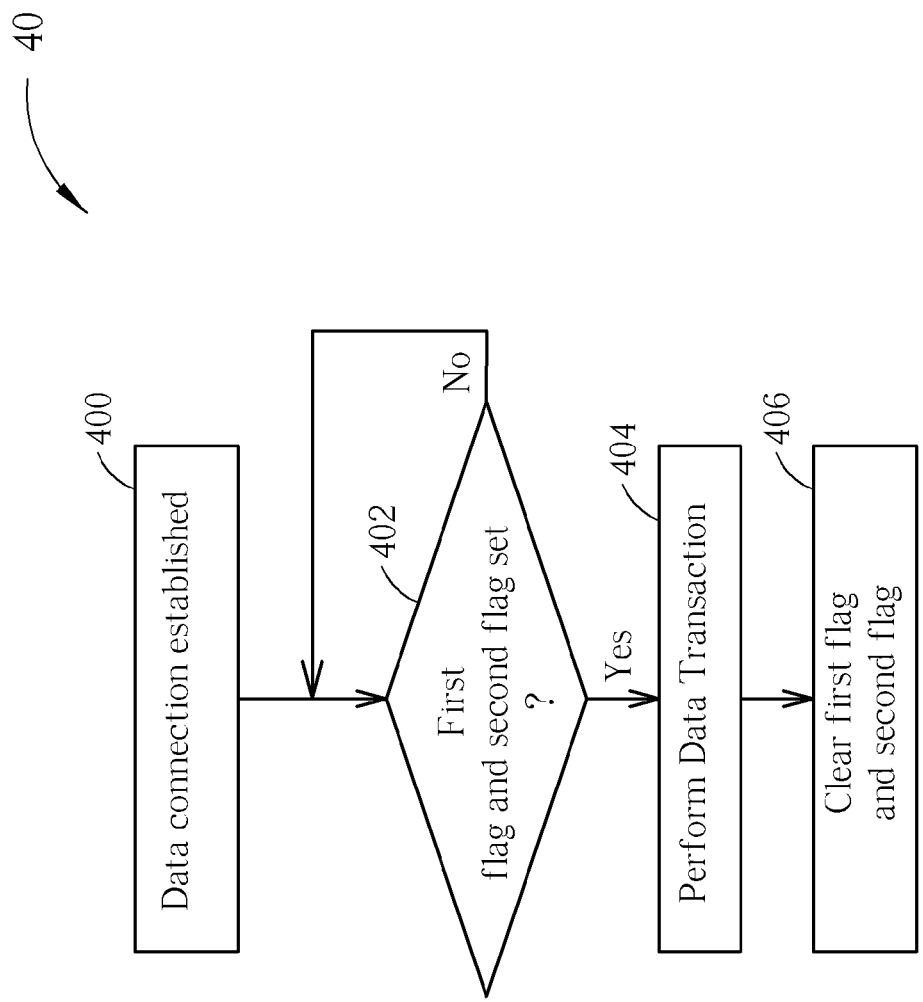
FIG. 4 is a diagram of a process, which may continue the process shown in FIG. 3.

Please refer to FIG. 4, which is a diagram of a process 40, which may continue the process 30 shown in FIG. 3. The process 40 includes:

Step 400: The data connection between the portable storage device and the electronic device is established;

Step 402: Determine whether the first flag and the second flag are set in the portable storage device; if so, go to step 404;

Step 404: Perform a data transaction between the portable storage device and the electronic device; and Step 406: Clear the first and second flag.

In step 400, the data connection between the portable storage device and the electronic device is established. Step 400 may be a result of attempting to establish a data connection in step 314 of the process 30. Step 400 may also be realized when a user physically connects the portable storage device 10 to the electronic device 11, such to establish a Universal Serial Bus (USB) data connection between the portable storage device 10 and the electronic device 11. Once the data connection is established between the portable storage device 10 and the electronic device 11 (step 400), the processing module 130 or the electronic device 11 may confirm that the first flag and the second flag are set (step 402), and the data transaction between the portable storage device 10 and the electronic device 11 (step 404). Step 402 is optional if the data connection established in step 400 is a result of step 314 of process 30. Once the data transaction is completed, the first flag and the second flag are both cleared (step 406) by the processing module 130, and the previous coordinates are substituted with the current position coordinates. In the above, after the first flag is set, if the first threshold excludes the data transaction if the current coordinates are identical to or within a specific range of the previous coordinates, and the portable storage device 10 returns to the position corresponding to the previous coordinates before the second flag is set, the first flag may be cleared. Once the first flag is cleared, the positioning module 110 and the processing module 130 are turned back on to resume steps 300, 302, 304, and 306.

Please note that, in step 200 and/or step 300 of the processes 20, 30 described above, the position coordinates may be obtained from the electronic device 11. For example, if the portable storage device 10 is connected to the electronic device 11 through a Universal Serial Bus (USB) cable or a wireless connection, such as a Wi-Fi or Bluetooth connection, and the electronic device 11 has a positioning module similar to the positioning modules described above, the portable storage device 10 may send a position request to the electronic device 11, and the electronic device 11 may send current position coordinates of the electronic device 11 to the portable storage device 10. If the electronic device 11 does not have a positioning module, but is in a substantially fixed position, e.g. a personal computer used in the home, the position coordinates may be stored on the electronic device 11 through user input or other methods, and the electronic device 11 may send the position coordinates stored thereon to the portable storage device 10. The electronic device 11 may also determine whether a predetermined threshold is reached to initiate the data transaction.

Please note that steps 200, 202, 204, 206, and the process 40 may be performed by the electronic device 11. The portable storage device 10 may continuously obtain the current position coordinates, and upload the current position coordinates to the electronic device 11, and the electronic device 11 may determine whether or not the first threshold and/or the second threshold described above is/are reached.

In steps 308 and 310, the electronic device 11 may be a server, e.g. a cloud service that allows manipulation of files through a browser interface. If the user is able to upload, delete, or otherwise modify files on the electronic device 11, the electronic device 11 may track changes in the data located thereon, and push the second flag to the portable storage device 10 when the amount of data changed on the server exceeds the second criterion. For example, the electronic device 11 may be a server that provides synchronization of files across multiple devices, e.g. the portable storage device 10, the electronic device 11, and other devices owned or operated by the user. If the user uploads, deletes, edits, archives, and/or otherwise manipulates the files on the electronic device 11 directly through a browser-based web application, the electronic device 11 may determine that synchronization is needed, and push the second flag to the portable storage device 10.

In the above embodiments, distance traveled by the portable storage device 10 is used as a meaningful indicator of when a data transaction is needed between the portable storage device and the electronic device 11. The position-based data transaction is intuitive, because manipulation of data on the portable storage device 10 may be more frequent when moving from position to position, e.g. from home to school, or from the office to home. Thus, the embodiments increase convenience, and help the user to perform backup even if the user forgets.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a data transaction between a portable storage device and an electronic device, the method comprising:

determining positions of the portable storage device by a positioning module;

calculating distance between a current position of the portable storage device and a position of the portable storage device executing a previous data transaction to determine whether a position-based criterion is met by a processing module;

establishing a data connection between the portable storage device and the electronic device when the position-based criterion is met; and performing the data transaction between the portable storage device and the electronic device.

2. The method of claim 1, wherein the position-based criterion is the distance traveled being greater than a predetermined distance threshold.

3. The method of claim 1, wherein the position-based criterion is shortest distance between the current position and the position of the previous data transaction.

4. The method of claim 1, further comprising:
calculating time since the previous data transaction by the processing module to determine whether a time-based criterion is met;
wherein the data transaction between the portable storage device and the electronic device is performed when at least the position-based criterion and the time-based criterion are met.

5. The method of claim 1, further comprising:
calculating data change since the previous data transaction by the processing module to determine whether a data-based change criterion is met;
wherein the data transaction between the portable storage device and the electronic device is performed when at least the position-based criterion and the data-based criterion are met.

6. The method of claim 5, wherein the data-based criterion is based on amount of data changed since the previous data transaction.

7. The method of claim 1, wherein the position-based criterion is the distance traveled being greater than a predetermined distance threshold and the current position being different from the position of the previous data transaction.

8. A method of performing a data transaction between a portable storage device and an electronic device, the method comprising:
determining positions of the portable storage device by a positioning module;
calculating distance between a current position of the portable storage device and a position of the portable storage device executing a previous data transaction to determine whether a position-based criterion is met by a processing module;
setting a first flag in a storage module of the portable storage device by the processing module when the position-based criterion is met; and
attempting to establish a data connection between the portable storage device and the electronic device when at least the first flag is set.

9. The method of claim 8, further comprising:
performing the data transaction between the portable storage device and the electronic device when the data connection is established.

10. The method of claim 8, further comprising:
issuing an alert when unable to establish the data connection.

11. The method of claim 10, wherein the data-based criterion is based on amount of data of the portable storage device changed since the previous data transaction.

12. The method of claim 8, further comprising:
setting a second flag in the storage module of the portable storage device when a time-based criterion is determined to be met by the processing module;
wherein attempting to establish the data connection between the portable storage device and the electronic device when at least the first flag is set is:
attempting to establish the data connection between the portable storage device and the electronic device when at least the first flag and the second flag are set.

13. The method of claim 8, further comprising:
setting a second flag in the storage module of the portable storage device when a data-based criterion is determined to be met by the processing module;
wherein attempting to establish the data connection between the portable storage device and the electronic device when at least the first flag is set is:
attempting to establish the data connection between the portable storage device and the electronic device when at least the first flag and the second flag are set.

14. A portable storage device comprising:
a storage module for storing data;
a positioning module for determining positions of the portable storage device;
a transceiver for establishing a data connection with an electronic device; and
a processing module for calculating distance between a current position of the portable storage device and a position of the portable storag -based criterion is met and synchronizing the data with an electronic device through the transceiver when the processing module determines that the position-based criterion is met.

15. The portable storage device of claim 14, wherein the transceiver is a wireless transceiver.

16. The portable storage device of claim 15, wherein the storage module is further for storing a flag that is set when the position-based criteria is met, and the processing module performs the data transaction when the flag is set and the data connection is established.

17. The portable storage device of claim 14, wherein the position-based criterion is the distance traveled being greater than a predetermined distance threshold.

18. The portable storage device of claim 14, wherein the processing module is on the electronic device.

19. The portable storage device of claim 14, further comprising:
a battery for powering the storage module, the positioning module, and the processing module.

20. The portable storage device of claim 14, wherein the positioning module comprises:
a satellite-based positioning module; and
an altimeter.

* * * * *